No. 11,859. Reissued Oct. 2, 1900.

J. B. ENTZ.

ELECTRIC RAILWAY.

(Application filed Aug. 3, 1900.)

3 Sheets—Sheet 1.

Witnesses:

Lewis E. Abell.

Benjamin B. Hull

Inventor:

Justus B. Entz, by Albert G. Davis

Atty

No. 11,859. Reissued Oct. 2, 1900.

J. B. ENTZ.

ELECTRIC RAILWAY.

(Application filed Aug. 3, 1900.)

3 Sheets—Sheet 2.

Witnesses:

Lewis C. Abell.

Benjamin B. Kuhn

Inventor:

Justus B. Entz, by Albert G. Davis

Atty.

No. 11,859. Reissued Oct. 2, 1900.

J. B. ENTZ.

ELECTRIC RAILWAY.

(Application filed Aug. 3, 1900.)

3 Sheets—Sheet 3.

Witnesses:

Lewis C. Abell.

Benjamin B. Lucas

Inventor.

Justus B. Entz, by Albert G. Davis

Atty.

UNITED STATES PATENT OFFICE.

JUSTUS B. ENTZ, OF PHILADELPHIA, PENNSYLVANIA, ASSIGNOR TO THE GENERAL ELECTRIC COMPANY, OF NEW YORK.

ELECTRIC RAILWAY.

SPECIFICATION forming part of Reissued Letters Patent No. 11,859, dated October 2, 1900.

Original No. 619,237, dated February 14, 1899. Application for reissue filed August 3, 1900. Serial No. 25,847.

*To all whom it may concern:*

Be it known that I, JUSTUS B. ENTZ, a citizen of the United States, residing at the city of Philadelphia, in the county of Philadelphia and State of Pennsylvania, have invented certain new and useful Improvements in Electric Railways, of which the following is a specification.

My invention relates to control systems for controlling a train of cars having more than one motor-car from the head of a train by the aid of a few (only one or two) conductors running through car to car.

The nature and characteristic features of my invention will be more fully understood from the following description, taken in connection with the accompanying drawings, forming a part thereof, while its scope will be pointed out in the appended claims.

Figure 1:
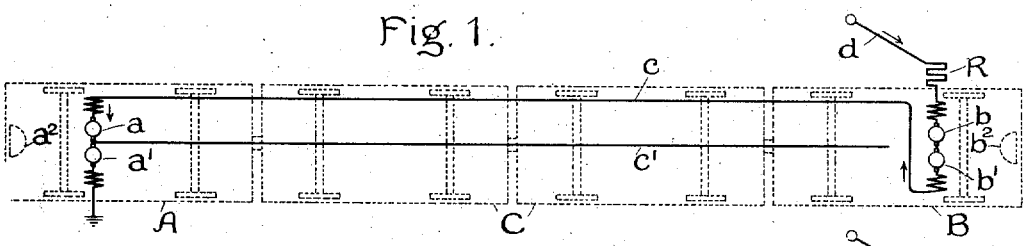
Figure 2:
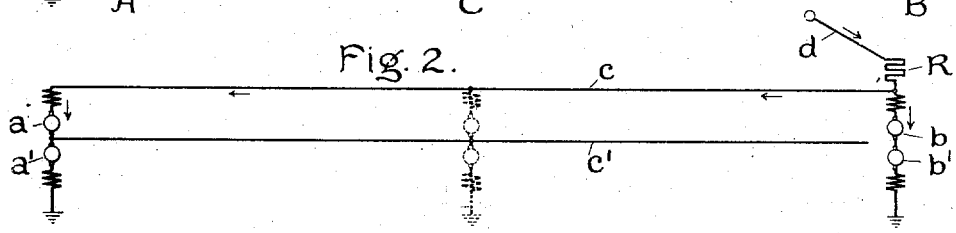
Figure 3:
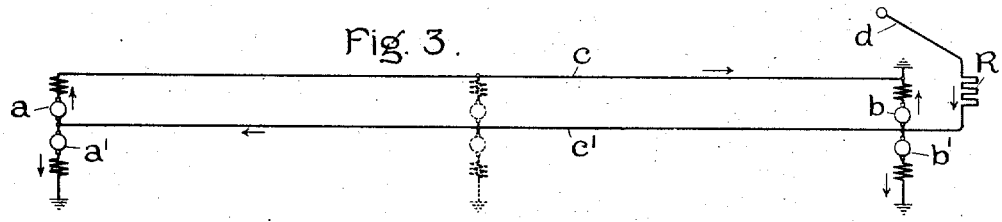
Figure 4:
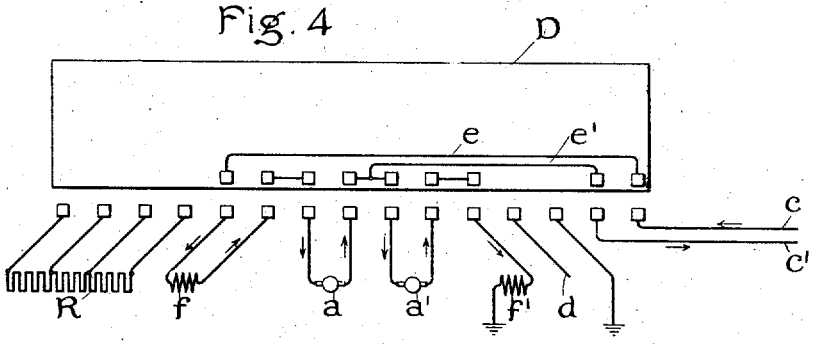
Figure 5:
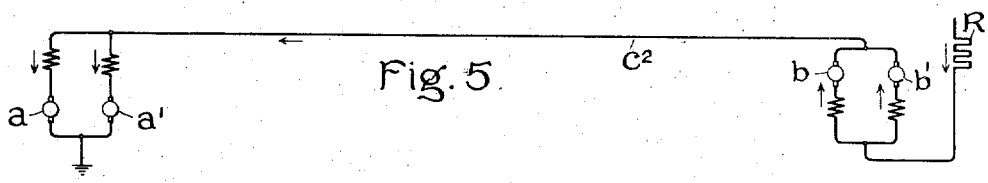
Figure 6:
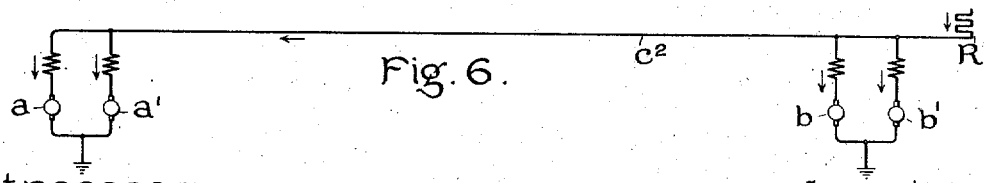
Figure 7:
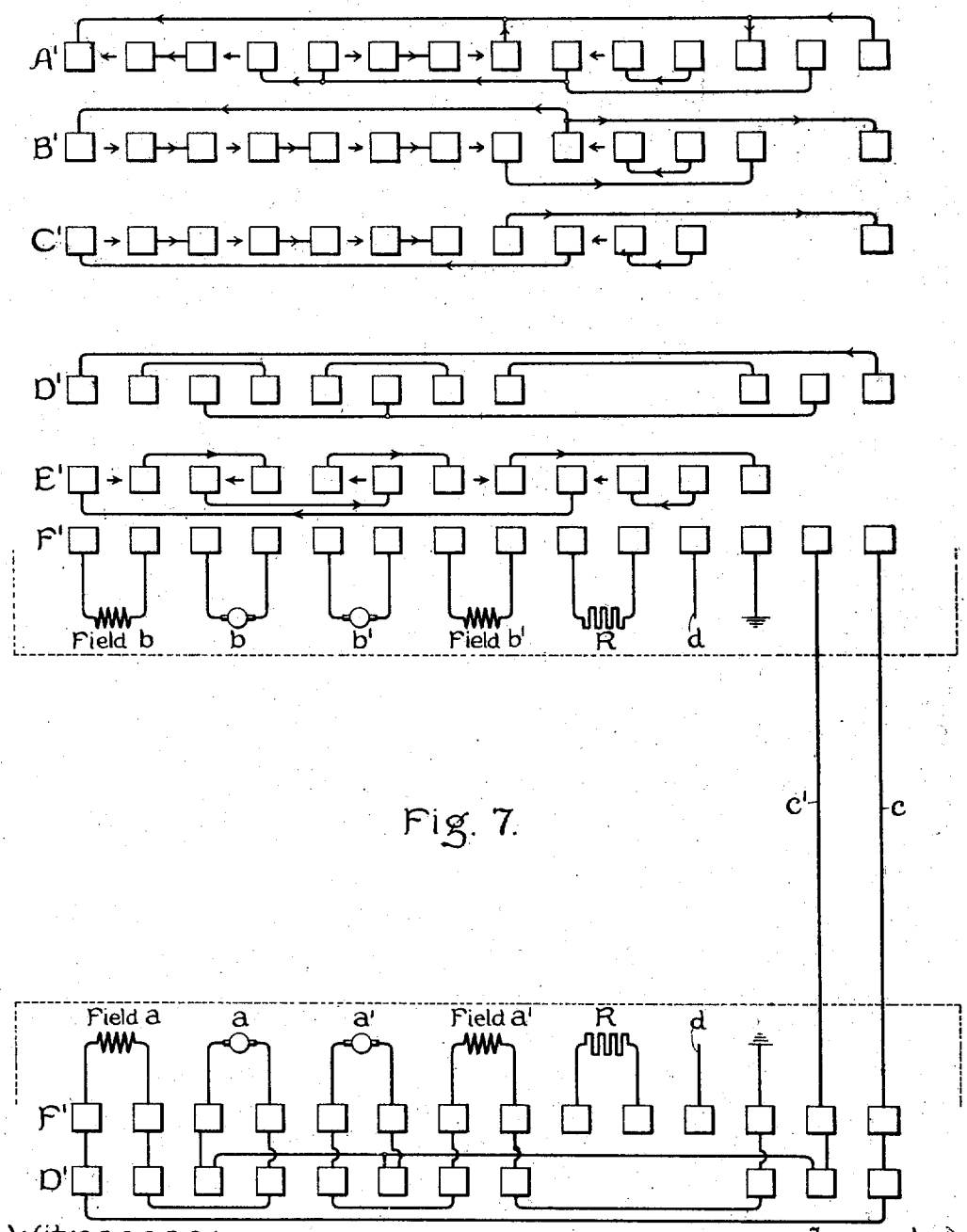
Figure 8:
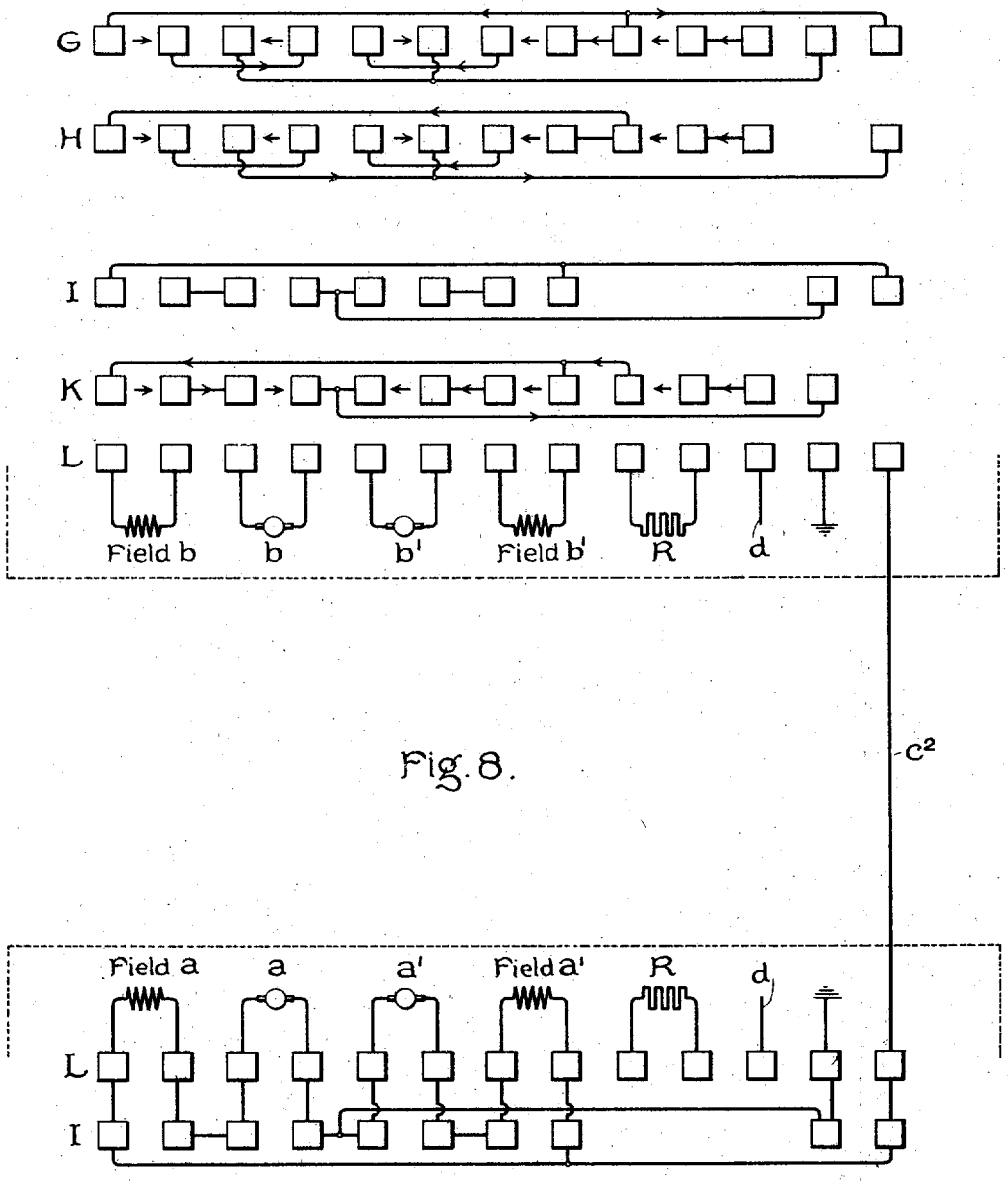

Referring to the drawings, Figure 1 is a diagrammatic view illustrating a train of four cars, of which those at each end are motor-cars, and showing the motors all in series. Fig. 2 is a similar view showing two groups of motors in parallel. Fig. 3 is a similar view showing all the motors in parallel. Fig. 4 is a similar view illustrating so much of the controller that is mounted on the front and rear cars as is necessary for a description of my invention. Figs. 5 and 6 are similar views showing, respectively, the motors in series and in parallel and also showing a single conductor that extends along the train. Fig. 7 is a diagrammatic view hereinafter referred to in connection with Figs. 1, 2, and 3 and illustrating as developed on a plane controller contacts and circuits; and Fig. 8 is a similar view relating to Figs. 5 and 6.

In the drawings, $a$ $a'$ and $b$ $b'$ are motors on the cars at the respective ends of the train. The end or motor cars are designated A and B in Fig. 1, and in the following description it will be assumed that the train is traveling from left to right on the drawings, and it must be understood that each end car, so far as its electrical equipment is concerned, is a duplicate of the other and in use becomes either the front or last car, according to circumstances, and there may of course be any number of intermediate cars C. $a^2$ and $b^2$ are duplicate controllers on the end cars.

Referring to Figs. 1 to 3, $c$ and $c'$ are conductors that extend from end to end of the train.

In Figs. 5 and 6, $c^2$ is a single conductor that extends throughout the length of the train.

Each motor-car is provided with sufficient resistance R for taking care of both motor-cars and with a suitable collector $d$ or trolley. Use is made of the trolley-pole or collector on the front car and of the resistance on the front car for taking care of the motors on both the front and back cars. The motorman on the front car operates the train by means of the controller on the front car, the controller on the back car being fixed and immovable. In moving forward the motors on the front and back cars coöperate in variable and appropriate combination or groups for the propulsion of the train. In running backward only the motors on the front car operate to back the train. This is not a disadvantage, because in the operation of railroads trains are always backed slowly. Each controller on the back and front cars is provided with all of the ordinary contacts and bridge connections that are required for putting its motors into series or parallel, for reversing its motors, for inserting resistance, and for doing everthing that controllers now do. In addition each controller is provided with contacts and their accessories, of which some coöperate with the conductor or conductors that extend along the train and of which the others permit the motors to be placed in definite combination on the rear car, all as will be hereinafter more fully described. The motors on the rear car remain in fixed combination in respect to each other and to the rear ends of the train-conductors; but as a group they are arranged in connection with the motors on the front car in various combinations, and these changes of arrangement are effected by the manipulation of the controller on the front car in respect to the front ends of the train-conductors and to the electrical equipment on the front car.

Referring to Figs. 1, 2, and 3, the motors on the rear car are always connected together and to the leads in the same way, and the resistance and the trolley-pole or traveling conductor are cut out, and the train-conductors *c c'* are connected at the rear controller to the motors on the rear car in fixed relation, the connections, as shown, being made at terminal and intermediate points in the motor-circuit. At the front car the controller is operated by the motorman and serves to include and exclude resistance to group the motors on the front car in different combinations and to connect the train-conductors also in different combinations, as well as to disconnect the train-conductors when the train is to be backed. As shown in Fig. 1, all of the motors are in series. As shown in Fig. 2, the two groups of motors are in parallel. As shown in Fig. 3, all the motors are in parallel.

Referring to Fig. 4, it will be understood that the controller cylinder or barrel D is provided with contacts, of which some are shown at the right-hand end and relate to and make circuit in various combinations with the train-conductors. It is also provided with contacts (some shown near the center) which operate to combine the motors and their accessories in different combinations with the train-conductors. To avoid confusion, all of these contacts are not shown, nor are the ordinary contacts with which all controllers are provided shown. Fig. 4 illustrates diagrammatically the contacts which I have added to the controller and which correspond to its fixed position for the back car, as shown in Figs. 1 and 3. Considering Fig. 4 in connection with Fig. 3, the current is by way of *c* to the contacts provided at the right-hand end of the controller, by way of bridge-wire *e* to field *f*, to motor *a*, thence by bridge-wire *e'* to train-wire *c'* and as a branch to motor *a'*, to field *f'*, and then to ground, the resistance R and trolley *d* being cut out. The arrows in Fig. 4 point out the path above traversed, whereas in the other figures the arrows may be taken to indicate direction of current. The described connection or group is the only one availed of on the controller of the rear car. On the controller of the front car use is made of the additional contacts that are provided for controlling the train-wires *c c'*. For example, to obtain the combination shown in Fig. 1 the train-wire *c'* or its brush or rubbing contact rests on an insulated portion of the controller-cylinder, whereas the train-conductor *c* rests on a contact that has a bridge-wire that connects it through the motors on the front car. In backing both the train-conductors are cut out at the controller on the front car, and the motors on the front car are reversed by the controller in the ordinary manner.

Referring to Fig. 7, at the upper part of the sheet are illustrated rows A', B', C', D', and E' of the contacts that are provided on the movable portion or barrel of the controller. F' is a row of controller brushes or contacts which may be assumed to be fixed and arranged for coöperation with the contacts of the rows A', B', C', D', and E'. The controller-brushes of the row F' are connected with the various parts of the equipment of the car, as shown. In the diagrammatic illustration the rows of contacts, which serve merely to introduce resistance in varying degrees between the trolley and the electrical equipment, have been omitted for the sake of clearness and because they are well understood. At the bottom of the sheet in Fig. 7 I have illustrated the row of contacts D' on the controller of the rear car in connection with the electrical equipment thereof. I have done this in order to illustrate the various circuits that extend from car to car; but it must be understood that the front and rear controllers are exactly alike. The row of contacts E' when shifted to contact with the row of brushes F' brings the motors on the forward car in series and into position for running backward. The arrows show the direction of current. Under these circumstances the train-conductors *c c'* are cut out and the equipment on the rear car is inoperative. The row of contacts D' is not used on the front car; but it is provided in order that when the front car becomes the last car it may be used for placing the electrical equipment in the relation shown at the lower part of the sheet in Fig. 7. The row of contacts C' when shifted into contact with the brushes of the row F' serves to put all four motors in series, as shown in Fig. 1, it being understood that the brush of the train-wire *c'* is without a contact in the row C', so that the current is grounded at the rear car. The row of contacts B' when shifted into contact with the row of brushes F' places two of the motors in series and two in multiple, as shown in Fig. 2. When the row of contacts A' is similarly shifted, all four motors are in multiple, as shown in Fig. 3.

Instead of providing the controllers with contacts adapted to make the connections shown in Figs. 1 to 3, inclusive, I may omit the contacts which make the connections shown in Fig. 1 and use only the combination shown in Figs. 2 and 3. By such a modification I am enabled to apply my invention to a train having more than two motor-cars, and in Figs. 2 and 3 I have illustrated by dotted lines how the additional motors may be connected. When this modification is employed, the motor equipments on the several motor-cars will in the first positions of the controller be connected all in multiple with the motors of each equipment supplied with current in series with one another, as is shown in the full and dotted lines in Fig. 2. In the later positions of the controller the circuit connections will be changed to those shown in Fig. 3; so that the motors of each equipment will be supplied with current in multiple instead of in series, the separate motor equipments being connected in multiple, as before. By this arrangement I am enabled to use a series multiple controller controlling the motors on any desired number of cars with the use of a train-conductor circuit or system comprising only two train-conductors.

Figs. 5 and 6 show a system different from that above described in that the motors on the rear car are connected in fixed combination with only a single train-conductor. This system constitutes no part of my invention; but I have illustrated it in order to render clear the application thereto of my arrangement for cutting out the train-conductor circuit or system when it is desired to operate the train in a reverse direction.

In Fig. 8, at the upper part of the sheet, are illustrated rows G, H, I, and K of the contacts provided on the movable portion or barrel of the controller that may be used in connection with the arrangement shown in Figs. 5 and 6. L is a row of controller brushes or contacts which may be assumed to be fixed and arranged for coöperation with the contacts of the rows G, H, I, and K. The controller-brushes of the row L are connected with the various parts of the car equipment, as shown. From the diagrammatic illustration the rows of contacts, which serve merely to introduce resistance in varying degrees between the trolley and the electrical equipment, have been omitted for the sake of clearness and because they are well understood. At the bottom of the sheet in Fig. 8 I have illustrated the row of contacts I on the controller of the rear car in connection with the electrical equipment thereof. I have done this in order to illustrate the electrical connections that extend from car to car; but it must be understood that the front and rear controllers are exactly alike. The row of contacts K when shifted to contact with the row of brushes L bring the motors on the front car into position for running backward. The arrows show the direction of current. Under these circumstances the train-conductor $c^2$ is cut out and the equipment on the rear car is inoperative. The row of contacts I is not used on the front car, but it is provided in order that when the front car becomes the last car it may be used for placing the electrical equipment in the relation shown at the lower part of the sheet in Fig. 8. The row of contacts H when shifted into contact with the brushes of the row L serves to put the motors on the two cars in series, Fig. 5. The row of contacts G when shifted into contact with the row of brushes L places the motors all in parallel, Fig. 6, and the current is grounded at each car.

I do not claim, broadly, means for operating motor-cars from each end of a train which comprise a train-conductor system or circuit and identical controllers on each motor-car provided, respectively, with devices for arranging the motors and train-conductor circuit or system in fixed combination on the rear car to drive the train forward and with devices for connecting the train-conductor circuit or system, trolley-conductor, and motors and their accessories in variable combinations on the front car; but What I do claim as my invention, and desire to secure by Letters Patent of the United States, is—

1. Means for operating motor-cars from each end of a train which comprise a train-conductor circuit or system, and identical controllers on each motor-car provided respectively with devices for arranging the motors and train-conductor circuit or system in fixed combination on the rear car and with devices for cutting out the train-conductor circuit or system and reversing the motors on the front car, substantially as described.

2. In combination, in a train system, having a motor-car at each end of the train, a plurality of train-conductors, and identical controllers on each end car provided respectively with devices for arranging the motors and train-conductors in fixed combination on the rear car and with devices for connecting the said train-conductors, trolley-conductor and motors and their accessories in variable combinations on the front car, substantially as described.

3. In combination, in a train system, a plurality of motor-cars, a plurality of motors permanently connected in series on each of said cars, a plurality of train-conductors, and identical controllers at each end of the train provided respectively with devices for connecting the said train-conductors to terminal and intermediate points in the motor-circuit on the rear car, and with devices for connecting the said train-conductors, trolley-conductor, and motors and their accessories in variable combinations on the front car.

4. In combination, in a train system, a plurality of motor-cars, two motors permanently connected in series on each of said cars, a train-conductor circuit or system comprising two conductors running from car to car, and identical controllers at each end of the train provided respectively with devices for connecting the said train-conductors to terminal and intermediate points in the motor-circuit on the rear car, and with devices for connecting the said train-conductors, trolley-conductor, and motors and their accessories in variable combinations on the front car.

5. In combination, in a train system, comprising any desired number of motor-cars, a plurality of motors on each of said cars, a series multiple controller for controlling said motors, and a train-conductor circuit or system comprising two train-conductors connecting said motors to said controller.

6. In combination, in a train system comprising any desired number of motor-cars, a plurality of motors on each of said cars, identical series multiple controllers for controlling the said motors located at each end of the train, a train-conductor circuit or system comprising a plurality of train-conductors connecting said motors to said controllers, and devices on each of said controllers for arranging the motors and train-conductors in fixed combination on the rear car.

In witness whereof I have hereunto set my hand this 5th day of July, 1900.

JUSTUS B. ENTZ.

Witnesses:

W. J. JACKSON,

A. B. STOUGHTON.